(12) United States Patent
Lombardo et al.

(10) Patent No.: US 11,567,169 B2
(45) Date of Patent: Jan. 31, 2023

(54) DYNAMIC RADAR SIGNAL CHANNEL DEACTIVATION IN A CASCADED RADAR SYSTEM FOR ACTIVE TEMPERATURE CONTROL

(71) Applicant: Infineon Technologies AG, Neubiberg (DE)

(72) Inventors: Francesco Lombardo, Munich (DE); George Efthivoulidis, Graz (AT); Rainer Findenig, Linz (AT); Alexander Melzer, Neutillmitsch (AT)

(73) Assignee: Infineon Technologies AG, Neubiberg (DE)

( * ) Notice: Subject to any disclaimer, the term of this patent is extended or adjusted under 35 U.S.C. 154(b) by 207 days.

(21) Appl. No.: 16/943,365

(22) Filed: Jul. 30, 2020

(65) Prior Publication Data
US 2022/0034998 A1 Feb. 3, 2022

(51) Int. Cl.
*G01S 7/40* (2006.01)
*G01K 3/00* (2006.01)
*G01S 7/35* (2006.01)

(52) U.S. Cl.
CPC ............... *G01S 7/40* (2013.01); *G01K 3/005* (2013.01); *G01S 7/4021* (2013.01); *G01S 7/352* (2013.01)

(58) Field of Classification Search
CPC .......... G01S 7/032; G01S 13/87; G01S 13/88; G01S 2013/9315; G01S 2013/0254; G01S 7/4069; G01S 13/44; G01S 13/282; G01S 13/347
See application file for complete search history.

(56) References Cited

U.S. PATENT DOCUMENTS

| | | | |
|---|---|---|---|
| 11,240,635 B1* | 2/2022 | Eckert | H04W 4/33 |
| 2007/0106428 A1 | 5/2007 | Omizo et al. | |
| 2018/0292511 A1* | 10/2018 | Bouchayer | G01S 7/4021 |
| 2019/0293784 A1 | 9/2019 | Khalid et al. | |
| 2020/0025870 A1 | 1/2020 | Melzer et al. | |
| 2020/0333176 A1* | 10/2020 | Welle | G01S 7/352 |
| 2020/0356149 A1* | 11/2020 | Chae | G06F 1/3215 |

FOREIGN PATENT DOCUMENTS

CN    103326115 A    9/2013

* cited by examiner

*Primary Examiner* — Timothy X Pham
(74) *Attorney, Agent, or Firm* — Harrity & Harrity, LLP

(57) ABSTRACT

A radar system is provided that includes a radar monolithic microwave integrated circuit (MMIC). The radar MMIC includes a plurality of radar signal channels; and at least one sensor configured to measure a physical parameter related to a temperature of the radar MMIC, and to generate sensor data corresponding to measured values of the physical parameter; and a controller configured to receive the sensor data from the at least one sensor, and to determine a channel operation of the plurality of radar signal channels, including selectively disabling at least a first radar signal channel of the plurality of radar signal channels and selectively enabling at least a second radar signal channel of the plurality of radar signal channels based on the measured values.

24 Claims, 5 Drawing Sheets

DYNAMIC RADAR SIGNAL CHANNEL DEACTIVATION IN A CASCADED RADAR SYSTEM FOR ACTIVE TEMPERATURE CONTROL

BACKGROUND

Modern radar devices such as radar range and velocity sensors can be integrated in so-called monolithic microwave integrated circuits (MMICs). Radar sensors may be applied, for example, in the automotive sector, where they are used in so-called advanced driver assistance systems (ADAS) such as, for example, "adaptive cruise control" (ACC) or "radar cruise control" systems. Such systems may be used to automatically adjust the speed of an automobile so as to maintain a safe distance from other automobiles travelling ahead. Radar sensors may also be used for emergency braking, parking assistance, and blind spot detection. However, RF circuits are also used in many other fields such as RF communication systems.

A radar MMIC (sometimes referred to as single chip radar) may incorporate all core functions of the RF frontend of a radar transceiver (e.g., local oscillator, power amplifiers, low-noise amplifiers (LNA), mixers, etc.), the analog pre-processing of the intermediate frequency (IF) or base band signals (e.g., filters, amplifiers, etc.), the analog-to-digital conversion, and the digital signal processing in one single package. The RF frontend usually includes multiple reception and transmission channels, particularly in applications in which beam steering techniques, phased antenna arrays, etc. are used. In radar applications, phased antenna arrays may be employed to sense the incidence angle of incoming RF radar signals (also referred to as "Direction of Arrival", DOA).

A microcontroller acts as a supervisor for a radar MMIC by sending commands and receiving responses over one or more communication channels. In the context of radar MMICs, so-called "cascaded systems" have emerged, whereby multiple MMICs are interconnected to embody a single overall system with increased resolution for radar targets discrimination. In the presence of internal (on-chip) or external (environmental) causes for overheating, the system might be brought to damage and/or failure. A first countermeasure to such occurrences is to shut the entire system down to allow the temperature to decrease. However, in such case the system and its functionalities will become unavailable. In other words, radar functionality is disabled altogether until the system is brought back online. In this sense therefore, system shut-off shall be considered purely a means to prevent physical damage, but it does not handle the issue actively.

Therefore, an improved system that monitors for temperature overages and provides countermeasures thereto while enabling system functionality may be desirable.

SUMMARY

Embodiments provide a radar system that includes a radar monolithic microwave integrated circuit (MMIC). The radar MMIC includes a plurality of radar signal channels; and at least one sensor configured to measure a physical parameter related to a temperature of the radar MMIC, and to generate sensor data corresponding to measured values of the physical parameter; and a controller configured to receive the sensor data from the at least one sensor, and to determine a channel operation of the plurality of radar signal channels, including selectively disabling at least a first radar signal channel of the plurality of radar signal channels and selectively enabling at least a second radar signal channel of the plurality of radar signal channels based on the measured values.

Embodiments further provide a method of monitoring a radar monolithic microwave integrated circuit (MMIC) comprising a plurality of radar signal channels. The method includes: measuring a physical parameter related to temperature of the radar MMIC; generating sensor data corresponding to measured values of the physical parameter; and determining a channel operation of the plurality of radar signal channels based on the measured values, including selectively disabling at least a first radar signal channel of the plurality of radar signal channels and selectively enabling at least a second radar signal channel of the plurality of radar signal channels.

Embodiments further provide a radar system that includes a plurality of a radar monolithic microwave integrated circuits (MMICs) comprising a plurality radar signal channels and a plurality of sensors configured to measure a physical parameter related to a temperature of a corresponding radar MMIC and generate sensor data corresponding to measured values of the physical parameter; and a controller configured to receive the sensor data from each sensor of the plurality of sensors, and determine a channel operation of the plurality of radar signal channels, including selectively disabling at least a first radar signal channel of the plurality of radar signal channels and selectively enabling at least a second radar signal channel of the plurality of radar signal channels based on the measured values.

Embodiments further provide a method of monitoring a plurality of radar monolithic microwave integrated circuits (MMICs) including a plurality of radar signal channels. The method includes: measuring a physical parameter related to a temperature of a corresponding radar MMIC for each of the plurality of MMICs; generating sensor data corresponding to measured values of the physical parameter for each of the plurality of MMICs; and determining a channel operation of the plurality of radar signal channels, including selectively disabling at least a first radar signal channel of the plurality of radar signal channels and selectively enabling at least a second radar signal channel of the plurality of radar signal channels based on the measured values.

BRIEF DESCRIPTION OF THE DRAWINGS

Embodiments are described herein making reference to the appended drawings.

DETAILED DESCRIPTION

Figure 1:
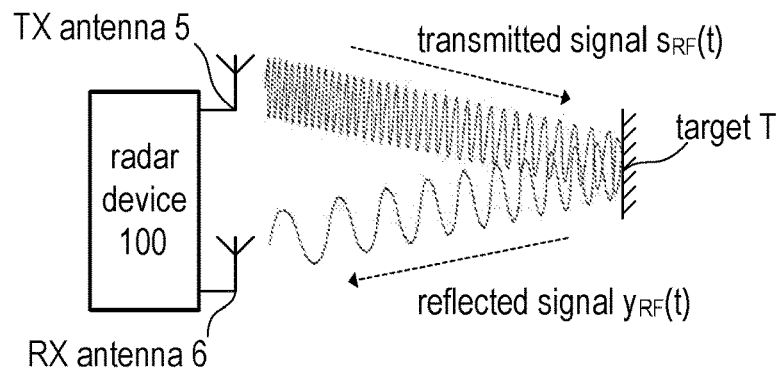
FIG. 1 is a schematic diagram for illustrating the functional principle of an FMCW radar system for distance and/or speed measurement.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLO, or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

FIG. 1 illustrates the application of a frequency-modulated continuous-wave (FMCW) radar system as sensor for the measurement of distances and speeds of objects, which are usually referred to as radar targets. In the present example, the radar device 100 comprises separate transmitting (TX) and receiving (RX) antennas 5 and 6 respectively (bistatic or pseudo-monostatic radar configuration). It should be noted, however, that a single antenna can also be used, which serves simultaneously as transmitting antenna and as receiving antenna (monostatic radar configuration). The transmitting antenna 5 emits a continuous RF signal $s_{RF}(t)$, which is frequency-modulated for example with a linear chirp signal (periodic, linear frequency ramp). The emitted signal $S_{RF}(t)$ is backscattered at the radar target T and the backscattered (reflected) signal $y_{RF}(t)$ is received by the receiving antenna 6. FIG. 1 shows a simplified example; in practice, radar sensors are systems comprising a plurality of transmitting (TX) and receiving (RX) channels, which may also be referred to as radar signal channels.

Figure 2:
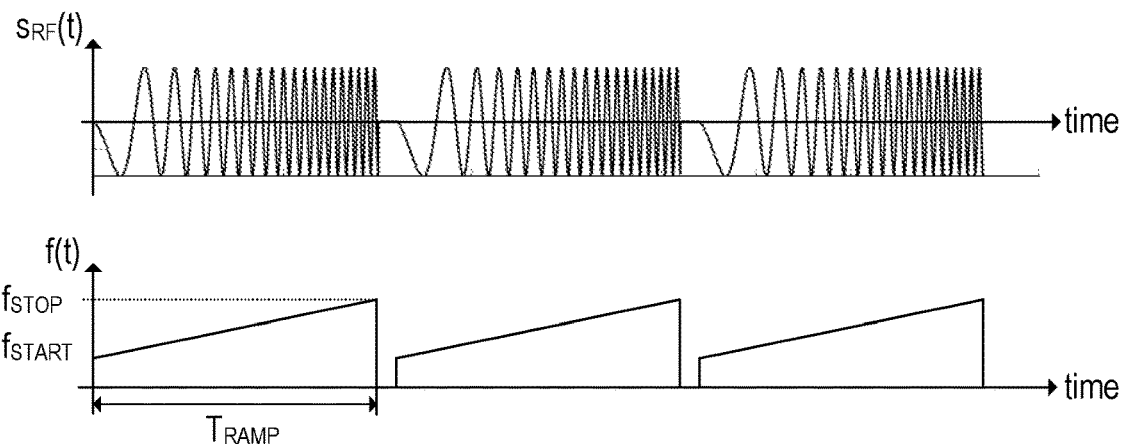
FIG. 2 comprises two timing diagrams for illustrating the frequency modulation of the RF signal generated by the FMCW system.

FIG. 2 illustrates by way of example the abovementioned frequency modulation of the signal $S_{RF}(t)$. As illustrated in FIG. 2, the signal $S_{RF}(t)$ is composed of a set of "chirps", that is to say that the signal $S_{RF}(t)$ comprises a sequence of sinusoidal signal profiles (waveforms) having a rising (Up-Chirp) or falling (Down-Chirp) frequency (see upper diagram in FIG. 2). In the present example, the instantaneous frequency f(t) of a chirp beginning at a start frequency $f_{START}$ rises linearly within a time period $T_{RAMP}$ to a stop frequency $f_{STOP}$ (see lower diagram in FIG. 2). Such chirps are also referred to as linear frequency ramps. FIG. 2 illustrates three identical linear frequency ramps. It should be noted, however, that the parameters $f_{START}$, $f_{STOP}$, $T_{RAMP}$ and also the pause between the individual frequency ramps can vary. The frequency variation also need not necessarily be linear. Depending on the implementation, transmission signals with exponential (exponential chirps) or hyperbolic (hyperbolic chirps) frequency variation can also be used, for example.

Figure 3:
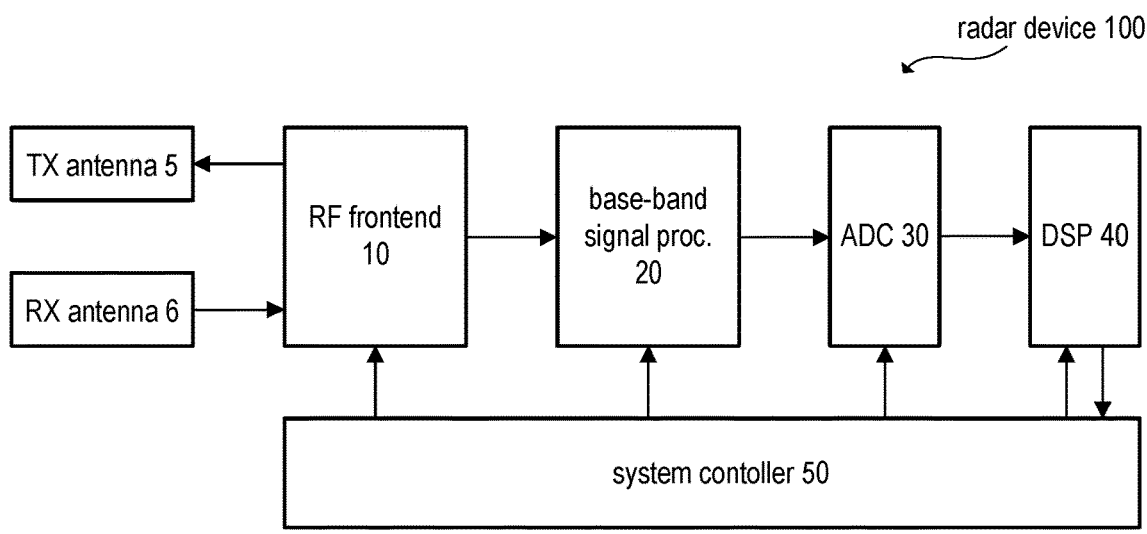
FIG. 3 is a block diagram for illustrating the fundamental structure of an FMCW radar system.

FIG. 3 is a block diagram which illustrates one possible structure of a radar device 100 (radar sensor) by way of example. Accordingly, at least one transmitting antenna 5 (TX antenna) and at least one receiving antenna 6 (RX antenna) are connected to an RF frontend 10 which is integrated in a monolithic microwave integrated circuit (MMIC) and which can include all those circuit components which are used for the RF signal processing. Said circuit components comprise for example a local oscillator (LO), RF power amplifiers, low-noise amplifiers (LNAs), directional couplers (e.g. rat race couplers, circulators, etc.) and mixers for down-converting the RF signals to baseband or an intermediate frequency (IF band). The RF frontend 10 if appropriate together with further circuit components can be integrated in an MMIC. The RF frontend 10 includes a transmitter module (i.e., transmitter) that includes one or more transmit TX channels and a receiver module (i.e., receiver) that includes one or more receive RX channels. However, it is also possible that an MMIC only includes a receiver with no transmitter or a transmitter with no receiver.

The example illustrated shows a bistatic (or pseudo-monostatic) radar system comprising separate RX and TX antennas. In the case of a monostatic radar system, a single antenna would be used both for emitting and for receiving the electromagnetic (radar) signals. In this case, a directional coupler (e.g. a circulator) can be used to separate the RF signals to be emitted into the radar channel from the RF signals (radar echoes) received from the radar channel. As mentioned, radar systems in practice usually comprise a plurality of transmitting and receiving channels having a plurality of transmitting and receiving antennas, respectively, which makes it possible, inter alfa, to measure the direction (DoA, direction of arrival) from which the radar echoes are received. In MIMO systems of this type, the individual TX channels and RX channels are usually constructed identically or similarly in each case.

In the case of a frequency-modulated continuous-wave radar system (FMCW radar system), the RF signals emitted via the TX antenna 5 can lie, for example, in the range of approximately 20 GHz to 100 GHz. As mentioned, the RF signal received by the RX antenna 6 comprises the radar echoes, i.e. those signal components which are backscattered at one or at a plurality of radar targets. The received RF signal $y_{RF}(t)$ is e.g. down-converted to baseband and processed further in baseband by means of analog signal processing (see FIG. 3, analog baseband signal processing chain 20). The analog signal processing mentioned substantially comprises filtering and, if appropriate, amplification of the baseband signal. The baseband signal is finally digitized (see FIG. 3, analog-to-digital convener 30) and processed further in the digital domain. The digital signal processing chain can be realized at least partly as software which can be executed on a processor, for example a microcontroller or a digital signal processor (see FIG. 3, DSP 40). The overall system is generally controlled by means of a system controller 50, which can likewise be implemented at least partly as software which can be executed on a processor such as e.g. a microcontroller. The RF frontend 10 and the analog baseband signal processing chain 20 (optionally also the analog-to-digital converter 40) can be jointly integrated in a single MMIC (i.e. an RF semiconductor chip). Alternatively, the individual components can also be distributed among a plurality of integrated circuits.

Figure 4:
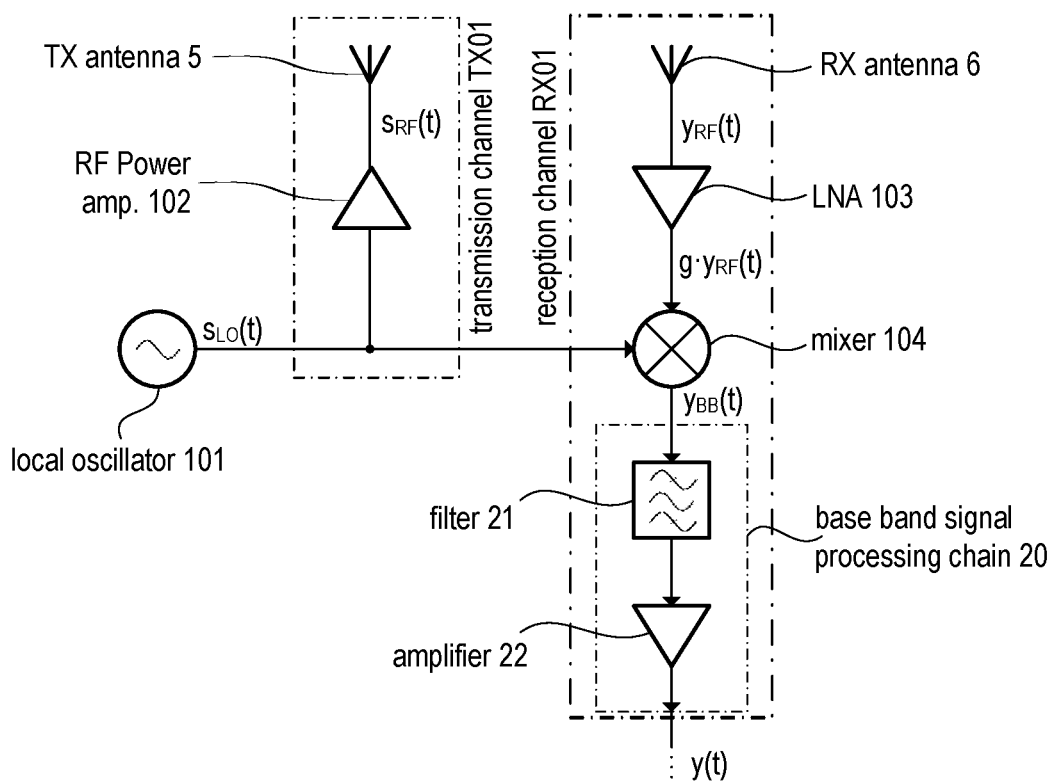
FIG. 4 is a simplified block diagram for illustrating an example implementation of a transmitting channel and of a receiving channel of a radar system.

FIG. 4 illustrates an example implementation of the RF frontend 10 with baseband signal processing chain 20 connected downstream, which can be part of the radar sensor from FIG. 3. It should be noted that FIG. 4 illustrates a simplified circuit diagram in order to show the fundamental structure of the RF frontend with one transmitting channel (TX channel TX01) and one receiving channel (RX channel RX01). Actual implementations, which may depend greatly on the specific application, can be more complex, of course, and generally comprise a plurality of TX and/or RX channels. The RF frontend 10 comprises a local oscillator 101 (LO), which generates an RF oscillator signal $S_{LO}(t)$. The RF oscillator signal $S_{LO}(t)$ can be frequency-modulated and is also referred to as LO signal. In radar applications, the LO signal typically comprises a plurality of frequency ramps, as described above with reference to FIG. 2, that lie in the Super High Frequency (SHF) hand (centimeter-wave) or in the Extremely High Frequency (EHF) band (millimeter-wave), e.g. in the interval of 76 GHz to 81 GHz in some automotive applications.

The LO signal $S_{LO}(t)$ is processed both in the transmission signal path (in the TX channel) and in the reception signal path (in the RX channel). The transmission signal $S_{RF}(t)$ (cf. FIG. 2), emitted by the TX antenna 5, is generated by amplifying the LO signal $S_{LO}(t)$, for example by means of the RF power amplifier 102, and is thus merely an amplified version of the LO signal $S_{LO}(t)$. The output of the amplifier 102 can be coupled to the TX antenna 5 (in the case of a bistatic or pseudo-monostatic radar configuration). The reception signal $y_{RF}(t)$ received by the RX antenna 6 is fed to the receiver circuit in the RX channel and thus directly or indirectly to the RF port of the mixer 104. In the present example, the RF reception signal $y_{RF}(t)$ (antenna signal) is preamplified by means of an amplifier 103 (gain g). The amplified RF reception signal $g \cdot y_{RF}(t)$ is thus fed to the mixer 104. The amplifier 103 can be a low noise amplifier (LNA). The LO signal $S_{LO}(t)$ is fed to the reference port of the mixer 104, such that the mixer 104 down-converts the (preamplified) RF reception signal $y_{RF}(t)$ to baseband. The down-converted baseband signal (mixer output signal) is designated by $y_{BB}(t)$. Said baseband signal $y_{BB}(t)$ is firstly processed further in analog fashion, wherein the analog baseband signal processing chain 20 substantially brings about amplification (amplifier 22) and filtering (e.g., bandpass filter 21) in order to suppress undesired sidebands and image frequencies. The resulting analog output signal, which is fed to an analog-to-digital converter (see FIG. 3, ADC 30), is designated by y(t). Methods for the digital further processing of the output signal (digital radar signal y[n]) are known per se (for example range doppler analysis) and therefore will not be discussed in further detail here.

In the present example, the mixer 104 down-converts the preamplified RF reception signal $g \cdot y_{RF}(t)$ (i.e. the amplified antenna signal) to baseband. The mixing can take place in one stage (that is to say from the RF band directly to baseband) or via one or more intermediate stages (that is to say from the RF band to an intermediate frequency band and further to baseband). In this case, the reception mixer 104 effectively comprises a plurality of individual mixer stages connected in series. In view of the example shown in FIG. 4, it becomes clear that the quality of a radar measurement depends greatly on the quality of the LO signal $S_{LO}(t)$, for example on the noise contained in the LO signal $S_{LO}(t)$, which is quantitatively determined by the phase noise of the local oscillator 101.

Figure 5:
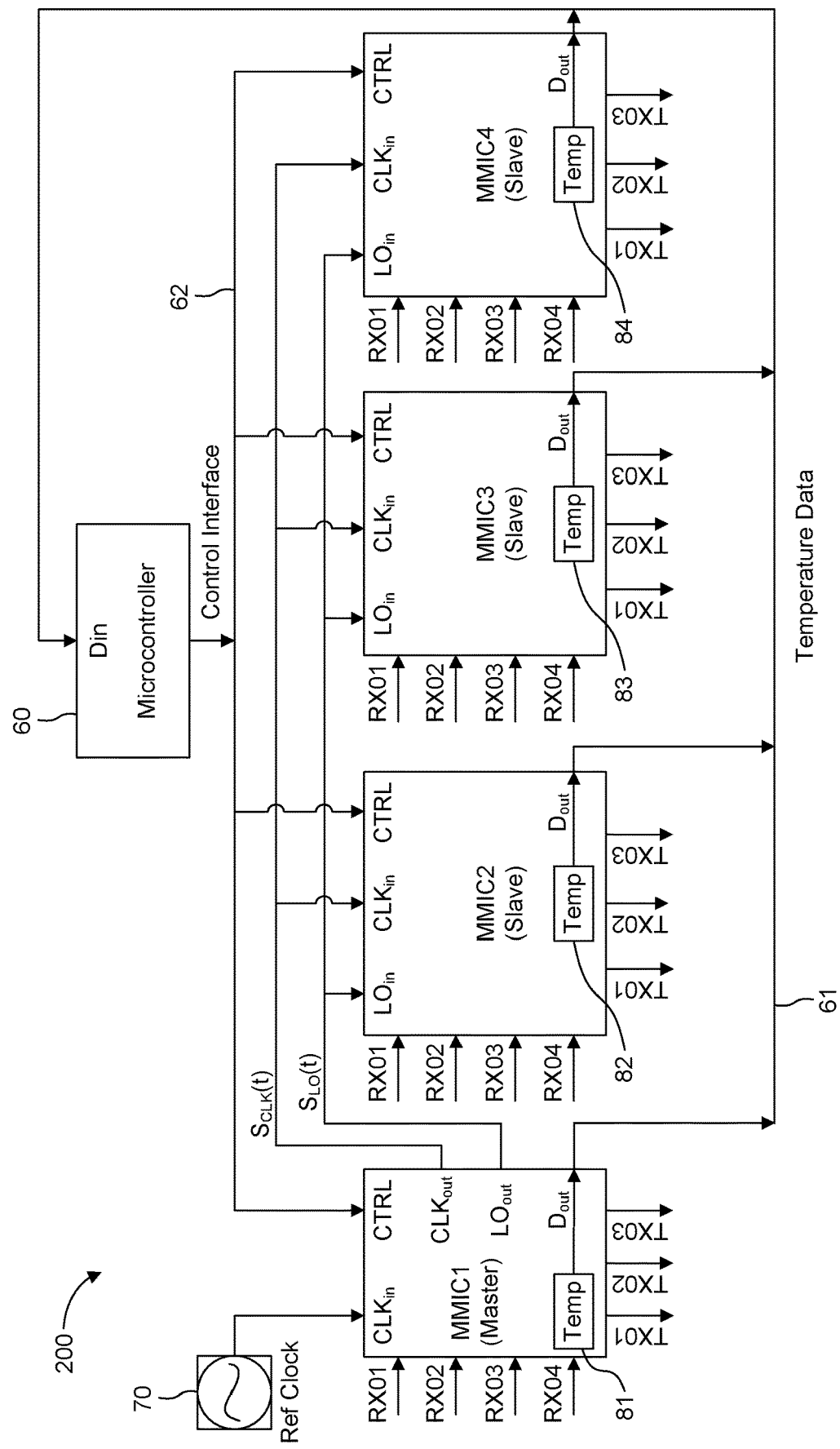
FIG. 5 is a schematic block diagram for illustrating a radar system comprising controller and a plurality of cascaded MMICs according to one or more embodiments.

FIG. 5 is a block diagram for illustrating a radar system 200 comprising controller and a plurality of cascaded MMICs according to one or more embodiments. In particular, radar system 200 is a MIMO radar system comprising a plurality of coupled (cascaded) MMICs 1, 2, 3, and 4 that are further coupled to a microcontroller 60. While the microcontroller 60 is shown external to the MMICs 1-4, it is to be understood that the microcontroller 60 may be integrated within one of the MMICs 1-4 while performing the same functions described herein.

Each MMIC 1, 2, 3 and 4 can comprise a plurality of transmitting channels TX01, TX02, TX03, etc. and a plurality of receiving channels RX01, RX02, RX03, RX04, etc. Each of the transmitting channels may be coupled to a respective transmit antenna for transmitting radar signals and each of the receiving channels may be coupled to a respective receive antenna for receiving (reflected) radar signals. However, as noted above, it is also possible that an MMIC only includes a receiver with no transmitter or a transmitter with no receiver. Thus, in some cases, an MMIC may not include any transmitting channels or may not include any receiving channels.

Each of the MMICs 1-4 may include a local oscillator (LO) that generates an RF oscillator signal $S_{LO}(t)$. However, for the operation of the radar system 200, it is beneficial for LO signals used by the MMICs to be coherent. Therefore, the LO signal is generated in one MIMIC—the master MMIC 1—and a representation of the LO signal is distributed to the slave MMICs 2, 3 and 4. The representation may for example be identical to the LO signal or the representation may be a frequency-divided signal which is then reconstructed at each MMIC by frequency multiplication. While in the following, a distribution of the LO signal will be described, it is to be understood that the following may also be applied to a frequency-divided distribution of the LO signal. In the example illustrated, for this purpose, the LO signal $S_{LO}(t)$ is passed from an LO output $LO_{out}$ of the master MMIC 1 to the LO inputs $LO_{in}$ of the respective slave MMICs 2, 3 and 4. In some embodiments, a unidirectional power splitter may first receive the LO signal $S_{LO}(t)$ from the master MMIC 1, and distribute the split signal to the LO inputs $LO_{in}$ of the respective slave MMICs 2, 3 and 4. In some embodiments, the master MMIC 1 could also use the LOout signal to feed itself using an additional LOin to make sure the LO signal is equally delayed between the master and the slave MMICs.

The LO output $LO_{out}$ and the LO inputs $LO_{in}$ can be realized as a pin, a solder ball, or the like, depending on the chip package. In some example implementations, the LO output $LO_{out}$ and/or the LO inputs $LO_{in}$ can be realized by dedicated external contacts (e.g. pin, solder ball, etc.). In order to keep the number of external contacts of the MMICs small, the output of a transmitting channel (e.g. channel TX03) can also be reconfigured as LO output or LO input. However, a transmitting channel configured LO output or LO input is then no longer available as an antenna port for connection to a (transmitting) antenna. In accordance with the example illustrated in FIG. 5, in the master MMIC 1, the RF output of the transmitting channel TX03 can be configured as LO output, for which purpose it is useful to adapt the gain of the RF amplifier (cf. FIG. 4, amplifier 102). The resultant adaptation (reduction) of the signal power may be useful or expedient in order to minimize the crosstalk to the receiving channels RX01, RX02 etc. (cf. FIG. 5) and in order to save energy. In the case of slave MMICs 2, 3 and 4, the RF outputs of the respective transmitting channels TX03 are configured as LO inputs, which can be realized by means of couplers and/or switches.

In the example illustrated, the outputs designated by TX01, TX02, and TX03 can be connected to (transmitting) antennas and the inputs designated by RX01, RX02, RX03 and RX04 can be connected to (receiving) antennas. It should be pointed out at this juncture that all the MMICs can comprise local oscillators 101 (e.g. PLLs), but the latter are not used in the MMICs 2-4 configured as slaves. For normal radar operation, the LO signal is generated centrally in the master MMIC and distributed among the slave MMICs. What is achieved in this way is that the LO signals processed in the MMICs are coherent.

In the example illustrated in FIG. 5, the master MMIC 1 generates the LO signal $S_{LO}(t)$ and distributes it via the LO output of the master MIMIC 1 to the slave MMICs 2, 3 and 4, as a result of which a plurality of MMICs can be connected in series (cascaded). A (system) clock signal $S_{CLK}(t)$ can likewise be generated by the master MMIC 1 and distributed to the slave MMICs 2, 3, and 4. The master MMIC 1 may generate the clock signal $S_{CLK}(t)$ from a reference clock signal received from a separate reference clock generator 70, such as a quartz oscillator. For this purpose, the MMICs 1, 2, 3, and 4 each have a separate clock output CLKout or clock input CLKin, which can be connected by means of strip lines. The clock signal $S_{CLK}(t)$ can have a clock frequency of a few MHz (e.g. 200 MHZ), whereas the LO signal has an LO frequency $f_{LO}$ of a plurality of GHz (e.g. 76-81 GHz) or a corresponding divided value (e.g., 13 GHz or 39 GHz).

Alternatively, the clock signal $S_{CLK}(t)$ can also be generated by the reference clock generator 70. In this case, the clock signal $S_{CLK}(t)$ generated by the clock generator chip is fed to all the MMICs (master MMIC 1 and slave MMICs 2-4).

Each MMIC 1, 2, 3 and 4 further includes a data output Dout for transmitting data corresponding to temperature data or data corresponding to temperature information. The data from each MMIC 1, 2, 3 and 4 is transmitted as feedback information to the microcontroller 60 that receives the data at a data input Din.

For example, each MMIC 1, 2, 3 and 4 may include at least one measurement circuit 81, 82, 83, and 84 that measures a temperature at the MMIC or a physical parameter related to the temperature at the MMIC. A temperature may be a chip temperature representative of the temperature of the MMIC, a transmitter temperature representative of the temperature of the transmitter module of the MMIC, a receiver temperature representative of the temperature of the receiver module of the MMIC, a transmitting channel temperature representative of the temperature of a transmitting channel of the MMIC, or a receiving channel temperature representative of the temperature of a receiving channel of the MMIC.

The measurement circuits 81, 82, 83, and 84 may be temperature sensors and multiple temperature sensors in each MMIC 1, 2, 3 and 4 may be provided. For example, each MMIC 1, 2, 3 and 4 may include one temperature sensor for measuring the temperature of its transmitter module and one temperature sensor for measuring the temperatures of its receiver module. Alternatively, each MMIC 1, 2, 3 and 4 may include one temperature sensor for each transmitting channel. Thus, the temperature of each transmitting channel can be measured and subsequently monitored by the microcontroller 60. Additionally, or alternatively, each MMIC 1, 2, 3 and 4 may include one temperature sensor for each receiving channel. Thus, the temperature of each receiving channel can be measured and subsequently monitored by the microcontroller 60. In view of the above, any combination of temperature sensors at the chip level, the module level, or the radar signal channel level is possible.

Alternatively, each measurement circuit 81-84 may be configured to measure a physical parameter related to the temperature of a corresponding radar signal channel and generate the sensor data corresponding to the measured values of the physical parameter. For example, a physical parameter may be a signal phase shift at the radar signal channel. A phase shift of a radar signal channel relative to radar signals in other channels may increase with an increasing temperature difference between the radar signal channels. This phenomenon may be referred to as phase drift and can occur when different channels or different MMICs operate at different temperatures. Thus, phase shifts between radar signal channels can be correlated with temperature differences. Phase drift may significantly impact the performance of an MMIC or the cascaded system and should be detected and prevented.

Based on the received data from each MMIC 1, 2, 3 and 4, the microcontroller 60 is configured to selectively activate and deactivate individual transmitters and receivers of each MMIC 1, 2, 3 and 4. When a transmitter or a receiver of an MMIC is activated, all transmit channels or receive channels of that MMIC may be activated, respectively. Similarly, when a transmitter or a receiver of an MMIC is deactivated, all transmit channels or receive channels of that MMIC may be deactivated, respectively. In other examples, the microcontroller 70 is configured to selectively activate and deactivate individual transmit channels and receive channels amongst the MMICs 1, 2, 3 and 4 (i.e., on a channel-by-channel basis) based on the received data.

The microcontroller 70 is configured receive the data (e.g., temperature data) from the MMIC 1, 2, 3 and 4 via a data bus 61 and generate control signals (e.g., disable signals and enable signals) that control the activation and deactivation of the radar signal channels at each MMIC 1, 2, 3 and 4. The control signals are received at a control input CTRL of the MMICs 1, 2, 3, and 4 via a control signal bus 62, where they are they received by the MMIC's respective system controller 50. Each system controller 50 handles the activation and deactivation of radar signal channels, including transmitting channels and/or receiving channels, based on the received control signals. By deactivating one or more radar signal channels, the temperature at the chip level, the module level, or the radar signal channel level can be lowered to safe and reliable operating levels.

The microcontroller 70 continues to monitor temperatures via the received data. Once a deactivated radar signal channel is deemed safe and reliable by the microcontroller 70, the microcontroller 70 can reactive the radar signal channel via a further control signal.

In addition, each MMIC 1, 2, 3, and 4 is configured to reconfigure its digital processing circuit (e.g., DSP 40) to take into account for at least one of its radar signal channels being disabled and again reconfigure its processing circuit when at least one of its radar signal channels is reenabled. The digital processing circuit is configured to process baseband data of the radar signals to determine a direction of arrival. The baseband data processing at each MMIC changes based on the number of radar signal channels are enabled and which ones, and conversely the number of radar signal channels that are disabled and which ones. Based on the control signals received from the microcontroller 60, the system controller 50 of an MMIC is configured to reconfigure the processing of the baseband signals to take into account the at least one radar signal channel that is selectively disabled.

Thus, by means of a monitoring system, the temperature can be periodically measured by on chip measurement circuit, such as a temperature sensor, to observe if and when the temperature of an MMIC, or module or radar signal channel thereof, rises above a pre-defined threshold related to a specific metric, which requires intervention to prevent the metric to degrade, or even the MMIC to be damaged. The proposed embodiments envisage a system that leverages the knowledge of each MMIC's temperature or each radar signal channel's temperature and dynamically deactivates the MMICs or radar signal channels for which the temperature has reached a critical value, with respect to some figure of merit to be met, such as maximum allowed temperature, or maximum tolerable phase drift resulting from temperature delta between MMICs/channels, until the temperature has returned below such level with some safety margin.

The microcontroller 60 performs monitoring of individual MMICs and/or individual radar signal channels (i.e., transmitting channels and/or receiving channels) by performing specific measurements to detect faults or defective operation. In such context, the on-chip temperature of individual sub-blocks of the radar system 200, e.g., individual MMICs and individual channels in transmit and/or receive subsystems within one MMIC, can be measured and reported back to the microcontroller 60.

If one of the MMICs reports a temperature which is higher than the maximum safe operating temperature (i.e., a maximum temperature threshold), the system falls back to an operating mode where fewer MMICs and/or fewer radar signal channels are operated. In other words, the MMIC or a portion thereof that reached the critical temperature is switched off (i.e., in the sense of active transmission or reception of radar payload, but still on electrically and for temperature monitoring purposes). Switching the MMIC or a portion thereof off allows its temperature to lower down to below a desired temperature margin away from the maximum critical temperature. For example, the microcontroller 60 continues to monitor the temperature of the disabled component (i.e., either an MMIC, a receiver module, a transmitter module, a specific receiving channel, or a specific transmitting channel), and re-enables the disabled component when its temperature is equal to or less than a re-enable threshold that is less than the maximum temperature threshold. Temporarily switching the MMIC or a portion thereof off to allow its temperature to decrease to acceptable levels inherently reduces the resolution of the radar system 200, but allows continuity of radar operation without a full system shutdown being needed.

As noted above, the on-chip temperature of each MMIC 1-4 may be measured and monitored against the maximum temperature threshold and subsequently against the re-enable threshold. If the on-chip temperature of an MMIC exceeds the maximum temperature threshold, the MMIC's receiver module (i.e., all its receiving channels) and its transmitting module (i.e., all its transmitting channels) may be disabled until the on-chip temperature decreases to be equal to or less than the re-enable threshold. Meanwhile, all other MMICs operating at an acceptable temperature remain enabled. Alternatively, only the receiver module (i.e., all its receiving channels) or only its transmitting module (i.e., all its transmitting channels) may be disabled until the on-chip temperature decreases to be equal to or less than the re-enable threshold.

The microcontroller 60 may further be configured to selectively enable and disable the MMICs 1-4 in a round-robin manner until all MMICs 1-4 are again operating at an acceptable temperature. For example, if two or more MMICs exceed the maximum temperature threshold at the same time, the microcontroller 60 may sequentially disable the MMICs 1-4 in a round-robin manner such that one or two MMICs is/are disabled at time until the temperatures of the two or more MMICs that exceeded the maximum temperature threshold decrease to be equal to or less than the re-enable threshold. If a duration of the round-robin phase exceeds a predetermined time interval because the temperatures do not drop to an acceptable level, the microcontroller 60 may disable all MMICs 1-4. This round-robin protocol may be used any time one or more MMICs exceed the maximum temperature threshold.

Alternatively, a receiver module temperature and/or a transmitter module temperature may be measured and monitored against a maximum temperature threshold and subsequently against a re-enable threshold. Thus, two temperature sensors in each MMIC may be utilized for separate temperature measurements. If the receiver module temperature exceeds the maximum temperature threshold, the MMIC's receiver module (i.e., all its receiving channels) may be disabled until the on-chip temperature decreases to be equal to or less than the re-enable threshold. Meanwhile, the transmitter module (i.e., all its transmitting channels) remains enabled and operable. Similarly, if the transmitter module temperature exceeds the maximum temperature threshold, the MMIC's transmitter module (i.e., all its transmitting channels) may be disabled until the on-chip temperature decreases to be equal to or less than the re-enable threshold. Meanwhile, the receiver module (i.e., all its receiving channels) remains enabled and operable. The maximum temperature threshold for the receiver module temperature and the transmitter module temperature may be the same or different values. Likewise, the re-enable threshold for the receiver module temperature and a transmitter module temperature may be the same or different values.

In some cases, full MMIC deactivation may only be triggered by the microcontroller 60 if the both the receiver module temperature and the transmitter module temperature exceed the maximum temperature threshold.

The microcontroller 60 may further be configured to selectively enable and disable the receiving channels in a receiver module whose receiver module temperature exceeds the maximum temperature threshold or selectively enable and disable the transmitting channels in a transmitter module whose transmitter module temperature exceeds the maximum temperature threshold in a round-robin manner until all receiving channels or all transmitting channels in an MMIC are again operating at an acceptable temperature. If a duration of the round-robin phase exceeds a predetermined time interval because the temperatures do not drop to an acceptable level, the microcontroller 60 may disable that MMIC. This round-robin protocol may be used any time a transmitter module or a receiver module exceeds the maximum temperature threshold.

The microcontroller 60 may further be configured to selectively enable and disable the receiver modules or the transmitter modules amongst the MMICs 1-4 in a round-robin manner until all receiver modules or all transmitter modules amongst the MMICs 1-4 are again operating at an acceptable temperature. For example, if two or more transmitter modules exceed the maximum temperature threshold at the same time, the microcontroller 60 may sequentially disable the transmitter modules amongst the MMICs 1-4 in a round-robin manner such that one or two transmitter modules is/are disabled at time until the temperatures of the two or more transmitter modules that exceeded the maximum temperature threshold decrease to be equal to or less than the re-enable threshold. If a duration of the round-robin phase exceeds a predetermined time interval because the temperatures do not drop to an acceptable level, the microcontroller 60 may disable all MMICs 1-4. This round-robin protocol may be used any time a transmitter module or a receiver module exceeds the maximum temperature threshold.

Additionally, or alternatively, a receiving channel temperature may be measured and monitored against a maximum temperature threshold and subsequently against a re-enable threshold for each receiving channel of an MMIC, across all MMICs 1-4. Thus, temperature sensors for each receive channel may be utilized for separate temperature measurements. Similarly, a transmitting channel temperature may be measured and monitored against a maximum temperature threshold and subsequently against a re-enable threshold for each transmitting channel of an MMIC, across all MMICs 1-4. The maximum temperature threshold for the receiving channel temperatures and the transmitting channel temperatures may be the same or different values. Likewise, the re-enable threshold for the receiving channel temperatures and the transmitting channel temperatures may be the same or different values.

If any of the receiving channel temperatures exceed the maximum temperature threshold, the corresponding receiving channel may be disabled until its temperature decreases to be equal to or less than the re-enable threshold. Meanwhile, the remaining radar signal channels (i.e., the remaining receiving channels and the transmitting channels) that have acceptable temperatures remain enabled. Similarly, if any of the transmitting channel temperatures exceed the maximum temperature threshold, the corresponding transmitting channel may be disabled until its temperature decreases to be equal to or less than the re-enable threshold. Meanwhile, the remaining radar signal channels (i.e., the remaining transmitting channels and the receiving channels) that have acceptable temperatures remain enabled.

The microcontroller 60 may further be configured to selectively enable and disable the receiving channels or the transmitting channels in an MMIC in a round-robin manner until all receiving channels or all transmitting channels in an MMIC are again operating at an acceptable temperature. For example, if two or more transmitting channels of an MMIC exceed the maximum temperature threshold at the same time, the microcontroller 60 may sequentially disable the transmitting channels of that MMIC in a round-robin manner such that one or two transmitting channels is/are disabled at time until the temperatures of the two or more transmitting channels that exceeded the maximum temperature threshold decrease to be equal to or less than the re-enable threshold. If a duration of the round-robin phase exceeds a predetermined time interval because the temperatures do not drop to an acceptable level, the microcontroller 60 may disable the transmitter module (i.e., all transmitting channels) of the MMIC. A similar round-robin protocol may be used for the receiving channels and the receiving module.

Additionally, the round-robin protocol can be extended across all the MMICs 1-4. For example, all transmitting channels amongst the MMICs 1-4 may be selectively enabled and disabled in a round-robin manner across all the MMICs 1-4 until all transmitting channels are again operating at an acceptable temperature. Likewise, all receiving channels amongst the MMICs 1-4 may be selectively enabled and disabled in a round-robin manner across all the MMICs 1-4 until all receiving channels are again operating at an acceptable temperature.

In some cases, full MMIC deactivation may only be triggered by the microcontroller 60 if all radar signal channels (i.e., all transmitting channels and all receiving channels) exceed the maximum temperature threshold. In some cases, full MMIC deactivation may only be triggered by the microcontroller 60 if a majority of radar signal channels (i.e., a majority of transmitting channels and receiving channels) of an MMIC exceed the maximum temperature threshold. In some cases, full transmitter module deactivation may only be triggered by the microcontroller 60 if all or a majority of transmitting channels of an MMIC exceed the maximum temperature threshold. In some cases, full receiver module deactivation may only be triggered by the microcontroller 60 if all or a majority of receiving channels of an MMIC exceed the maximum temperature threshold. Furthermore, it is assumed that if the master MMIC 1 has to be deactivated, the LO distribution of the LO signal $S_{LO}(t)$ and the system clock distribution of the clock signal $S_{CLK}(t)$ to the other MMICs is kept functional (i.e., the deactivation is in this case partial to maintain system functionality).

In view of the above, any combination of monitoring for the dynamic activation and deactivation of MMICs or portions thereof within the radar system 200 is possible. As noted above, some MMICs may not include a receiver module or may not include a transmitting module, while others may have both.

Figure 6:
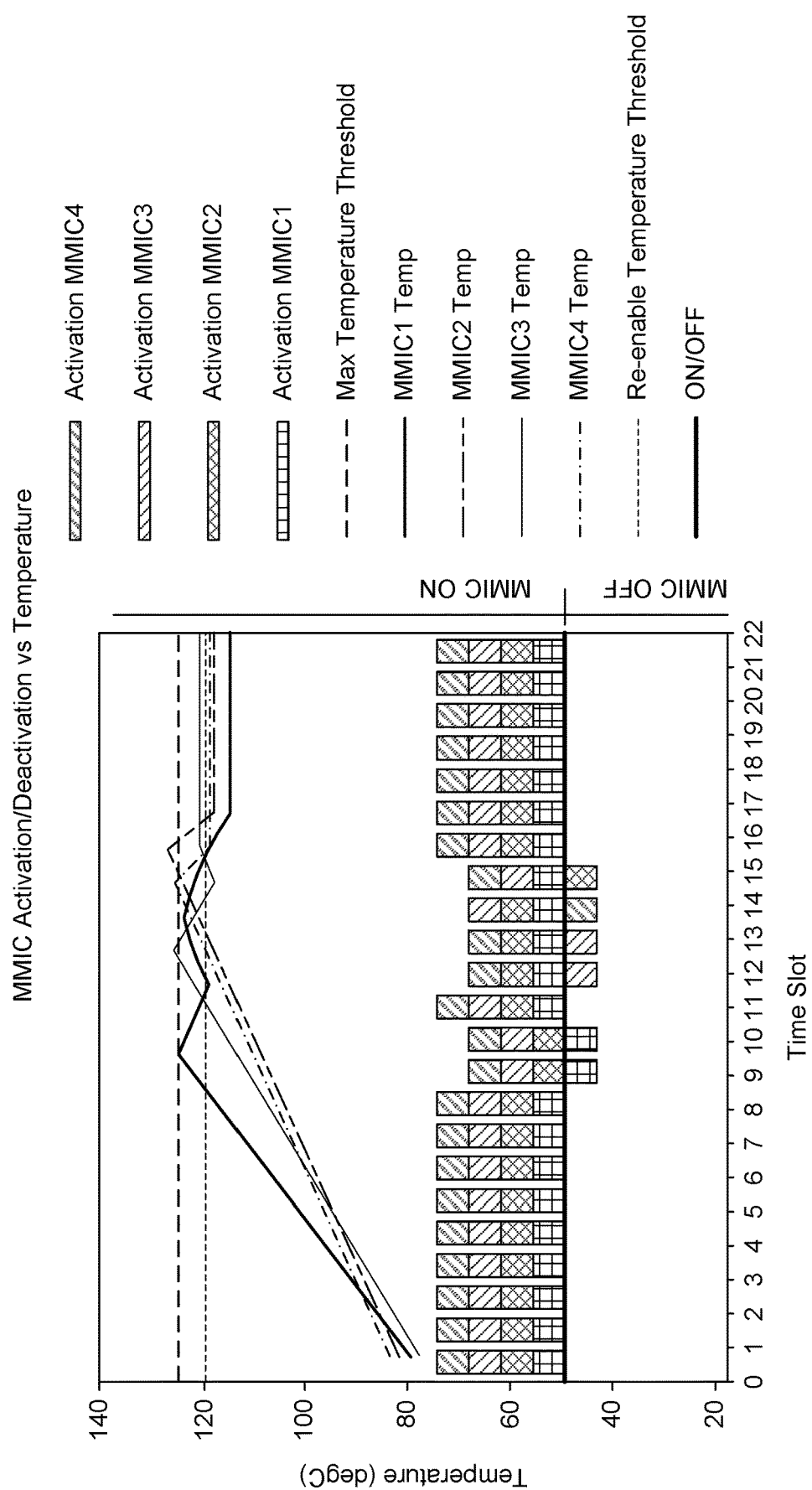
FIG. 6 is an activation/deactivation graph according to temperature according to one or more embodiments.

FIG. 6 is an activation/deactivation graph according to temperature according to one or more embodiments. Here, MMICs are off if they are indicated below the ON/OFF line and are on if they are indicated above the ON/OFF line. The maximum temperature threshold and the re-enable temperature threshold are also shown. When an MMIC reaches the maximum temperature threshold, it is switched off until its temperature falls to the re-enable temperature threshold. In particular, the microcontroller 60 is configured to synchronously sample the sensor data of the plurality of sensors (i.e., measurement circuits 81-84) at predetermined sampling times or time slot. An MMIC is deactivated in a time slot following the time slot in which a temperature equal to or higher than the maximum temperature threshold is recorded. A similar comparison can be made at the receiver module level for all receiver modules amongst the MMICs 1-4, the transmitter module level for all transmitter modules amongst the MMICs, or the radar signal channel level within a single MMIC or amongst all MMICs.

Deactivation times may also vary. For example, a deactivation time may be set for a longer time for the MMICs, modules, or radar signal channels showing higher temperatures. A deactivation time may be set for a longer time for the MMICs, modules, or radar signal channels showing slower cool-down rate. Also, an MMIC may be permanently deactivated if after a certain OFF time the temperature never decreases or keeps increasing (as potentially indicating a fault).

Figure 7:
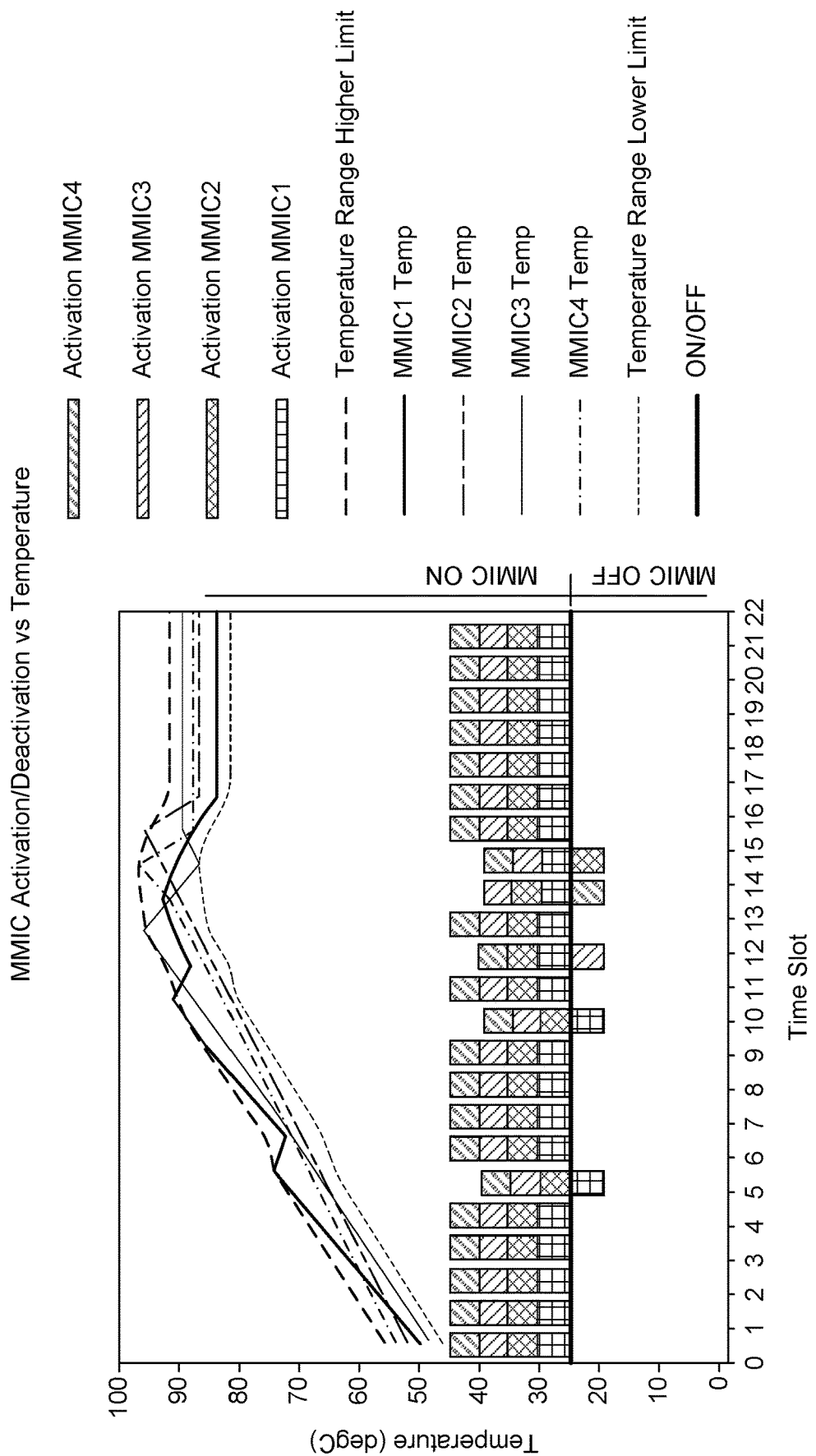
FIG. 7 is an activation/deactivation graph according to temperature according to one or more further embodiments.

FIG. 7 is an activation/deactivation graph according to temperature according to one or more further embodiments. Here, the MMICs 1-4 in the cascaded system 200 show a relative delta in temperature between each other, which would cause excessive relative phase drift between channels and result in impacted performance. In particular, the microcontroller 60 is configured to compare the measured temperature values of the MMICs 1-4 to each other.

Alternatively, the microcontroller 60 may be configured to compare the measured temperature values of all receiver modules to each other, compare the measured temperature values of all transmitter modules to each other, compare the measured temperature values of all receiving channels within an MMIC to each other, compare the measured temperature values of all receiving channels across all MMICs to each other, compare the measured temperature values of all transmitting channels within an MMIC to each other, compare the measured temperature values of all transmitting channels across all MMICs to each other, compare the measured temperature values of all radar signal channels within an MMIC to each other, and/or compare the measured temperature values of all radar signal channels across all MMICs to each other. Thus, FIG. 7 merely illustrates one example implementation that can be extended to the module level or to the radar signal channel level.

In FIG. 7, in each time slot, the temperature of each MMIC 1-4 is sampled by the microcontroller 60. In each time slot, the microcontroller 60 is configured to compare the measured temperature values of the MMICs (or modules or radar signal channels) to each other, including: determine a minimum value of the measured temperature values (i.e., temperature range lower limit), determine a maximum value of the measured temperature values (i.e., temperature range higher limit), calculate a delta value between the minimum value and the maximum value, and compare the delta value to a maximum delta value threshold. On a first condition that the delta value exceeds the maximum delta value threshold, transmit a first disable signal to disable an MMIC associated with the maximum value. That is, the MMIC (or module or radar signal channel) that is at the temperature range higher limit (i.e., has the highest temperature value among MMICs) with a delta value that exceeds the maximum delta value threshold is disabled.

The microcontroller 60 continues to monitor the temperature values at subsequent time slots. In response to disabling an MMIC (or module or radar signal channel), the microcontroller 60 is configured transmit an enable signal to re-enable the MMIC (or module or radar signal channel) in response to detecting a subsequent measured temperature value of the disabled MMIC (or module or radar signal channel) within a tolerance range of subsequent measured temperature values of the remaining MMICs (or modules or radar signal channels). That is, once the temperature of the MMIC no longer exceeds the maximum delta value threshold when compared to the temperatures of the other MMIC, it can be re-enabled.

Additionally, upon detecting that one of the MMICs (or modules or radar signal channels) meets a disable condition, the microcontroller 60 may selectively enable and disable the MMICs 1-4 (or modules or radar signal channels) in a round-robin manner until the delta values between all MMICs 1-4 (or modules or radar signal channels) are less than the maximum delta value threshold.

Alternatively, the microcontroller 60 may be configured to compare the measured temperature values of the MMICs (or modules or radar signal channels) to each other, including: determine an average value of the measured temperature values, calculate at least one delta value for each of the measured temperature values that exceeds the average value, each of the at least one delta value corresponding to a difference between a different one of the measured values and the average value, compare each of the at least one delta value to a maximum delta value, and on a condition that a delta value of the at least one delta value exceeds the maximum delta value, transmit a disable signal to disable the MMIC (or module or radar signal channel) associated with the delta value that exceeds the maximum delta value.

In other words, if a measured temperature value of an MMIC (or module or radar signal channel) exceeds the average value of all measured temperature values, then the microcontroller 60 performs a further analysis on that MMIC (or module or radar signal channel). In particular, the microcontroller 60 determines whether the temperature of that MMIC (or module or radar signal channel) exceeds the average value by a maximum delta value. If so, that MMIC (or module or radar signal channel) is disabled until its temperature no longer exceeds the average value by a maximum delta value. As before, the microcontroller 60 synchronously samples the temperatures and preforms its evaluation at each time slot.

Thus, the purpose is to ensure that the temperature of each individual MMIC (or module or radar signal channel) stays within some pre-defined limit from the average temperature, or that the temperature of an MMIC (or module or radar signal channel) having the maximum temperature is within a pre-defined limit from the temperature of an MMIC having the minimum temperature.

A dedicated algorithm may estimate the phase drift that results from the current temperature differences at the different MMICs, or at the different channels within each MMIC, and the performance degradation that would result from deactivating a subset of the channels, be it within one MMIC or deactivating one entire MMIC transmitter. When the algorithm recognizes that the relative temperature difference between MMICs or between TX and/or RX channels of one or more MMICs is such that the corresponding phase drift would result in excessive performance degradation, a subset of the TX/RX channels/MMICs is deactivated, according to the above-described criteria. In this case, the purpose is to keep these channels deactivated until all MMICs show temperature levels which are within a certain maximum allowed range.

Additionally, upon detecting that one of the MMICs (or modules or radar signal channels) meets a disable condition, the microcontroller 60 may selectively enable and disable the MMICs 1-4 (or modules or radar signal channels) in a round-robin manner until the temperature values for all MMICs 1-4 (or modules or radar signal channels) are within an acceptable tolerance range from the average temperature value.

The following additional embodiments are provided.

1. A radar system, comprising:
a radar monolithic microwave integrated circuit (MMIC) comprising: a plurality of radar signal channels; and at least one sensor configured to measure a physical parameter related to a temperature of the radar MMIC, and to generate sensor data corresponding to measured values of the physical parameter; and
a controller configured to receive the sensor data from the at least one sensor, and to determine a channel operation of the plurality of radar signal channels, including selectively disabling at least a first radar signal channel of the plurality of radar signal channels and selectively enabling at least a second radar signal channel of the plurality of radar signal channels based on the measured values.

2. The radar system of embodiment 1, wherein: the controller is configured to selectively enable and disable the plurality of radar signal channels in a round-robin manner such that selectively disabled and selectively enabled radar signal channels change in the round-robin manner.

3. The radar system of embodiment 1, wherein the plurality of radar signal channels are transmit channels for transmitting radar signals.

4. The radar system of embodiment 1, wherein the plurality of radar signal channels are receive channels for receiving backscattered radar signals.

5. The radar system of embodiment 1, wherein:
the at least one sensor includes a plurality of sensors each associated with a different one of the plurality of radar signal channels for measuring the physical parameter corresponding thereto.

6. The radar system of embodiment 5, wherein the controller is configured to synchronously sample the sensor data of the plurality of sensors at predetermined sampling times.

7. The radar system of embodiment 5, wherein: the controller is configured to compare the measured values to a maximum threshold, and on a first condition that a measured value of an associated radar signal channel exceeds the maximum threshold, the controller is configured to transmit a first disable signal to disable the associated radar signal channel.

8. The radar system of embodiment 7, wherein: each of the at least one sensor is a temperature sensor, the measured values are measured temperature values, and the maximum threshold is a maximum temperature threshold.

9. The radar system of embodiment 7, wherein the first disable signal is configured to selectively enable and disable the plurality of radar signal channels in a round-robin manner such that selectively disabled and selectively enabled radar signal channels change in the round-robin manner.

10. The radar system of embodiment 7, wherein: in response to disabling the associated radar signal channel, the controller is configured to receive a subsequent measured value of the associated radar signal and compare the subsequent measured value to a re-enable threshold, wherein the re-enable threshold is less than the maximum threshold, and on a second condition that the subsequent measured value of the associated radar signal channel is equal to or less than the re-enable threshold, the controller is configured to transmit a first enable signal to re-enable the associated radar signal channel.

11. The radar system of embodiment 7, wherein: on a second condition that the measured values of the plurality of radar signal channels each exceed the maximum threshold, the controller is configured to transmit a second disable signal to disable the plurality of radar signal channels.

12. The radar system of embodiment 1, wherein: the controller is configured to compare the measured values of the plurality of radar signal channels to each other, including:
determine a minimum value of the measured values,
determine a maximum value of the measured values,
calculate a delta value between the minimum value and the maximum value,
compare the delta value to a maximum delta value, and on a first condition that the delta value exceeds the maximum delta value, transmit a first disable signal to disable a radar signal channel associated with the maximum value.

13. The radar system of embodiment 12, wherein: in response to disabling the associated radar signal channel, the controller is configured transmit a first enable signal to re-enable the associated radar signal channel in response to detecting a subsequent measured value of the associated radar signal channel within a tolerance range of subsequent measured values of remaining transmit channels.

14. The radar system of embodiment 12, wherein: on the first condition that the delta value exceeds the maximum delta value, the controller is configured to transmit the first disable signal to disable the plurality of transmit channels in a round-robin manner.

15. The radar system of embodiment 1, wherein: the controller is configured to compare the measured values of the plurality of radar signal channels to each other, including:
determine an average value of the measured values,
calculate at least one delta value for each of the measured values that exceeds the average value, each of the at least one delta value corresponding to a difference between a different one of the measured values and the average value,
compare each of the at least one delta value to a maximum delta value, and
on a first condition that a delta value of the at least one delta value exceeds the maximum delta value, transmit a first disable signal to disable a radar signal channel associated with the delta value that exceeds the maximum delta value.

16. The radar system of embodiment 1, wherein: the radar MMIC comprises a digital processing circuit configured to process baseband data of the radar signals to determine a direction of arrival, and the radar MMIC is configured to reconfigure the processing of the baseband signals to take into account the at least one channel of the plurality of radar signal channels that is selectively disabled.

17. A method of monitoring a radar monolithic microwave integrated circuit (MMIC) comprising a plurality of radar signal channels, the method comprising: measuring a physical parameter related to temperature of the radar MMIC; generating sensor data corresponding to measured values of the physical parameter; and determining a channel operation of the plurality of radar signal channels based on the measured values, including selectively disabling at least a first radar signal channel of the plurality of radar signal channels and selectively enabling at least a second radar signal channel of the plurality of radar signal channels.

18. A radar system, comprising: a plurality of a radar monolithic microwave integrated circuits (MMICs) comprising a plurality radar signal channels and a plurality of sensors configured to measure a physical parameter related to a temperature of a corresponding radar MMIC and generate sensor data corresponding to measured values of the physical parameter; and a controller configured to receive the sensor data from each sensor of the plurality of sensors, and determine a channel operation of the plurality of radar signal channels, including selectively disabling at least a first radar signal channel of the plurality of radar signal channels and selectively enabling at least a second radar signal channel of the plurality of radar signal channels based on the measured values.

19. The radar system of embodiment 18, wherein: the plurality of radar MMICs comprise a plurality of transmitters, and each MMIC of the plurality of radar MMICs which comprises a transmitter of the plurality of transmitters comprises: a portion of the plurality radar signal channels; and a sensor of the plurality of sensors. The controller is configured to determine the channel operation of the plurality of radar signal channels by selectively disabling at least a first transmitter of the plurality of transmitters and selectively enabling at least a second transmitter of the plurality of transmitters based on the measured values.

20. The radar system of embodiment 19, wherein: the controller is configured to compare the measured values to a maximum threshold, and on a first condition that a measured value of an associated transmitter exceeds the maximum threshold, the controller is configured to transmit a first disable signal to disable the associated transmitter.

21. The radar system of embodiment 20, wherein:
in response to disabling the associated transmitter, the controller is configured to receive a subsequent measured value of the associated transmitter and compare the subsequent measured value to a re-enable threshold, wherein the re-enable threshold is less than the maximum threshold, and
on a second condition that the subsequent measured value of the associated transmitter is equal to or less than the re-enable threshold, the controller is configured to transmit a first enable signal to re-enable the associated transmitter.

22. The radar system of embodiment 19, wherein: the controller is configured to compare the measured values of the plurality of transmitters to each other, including:
determine a minimum value of the measured values,
determine a maximum value of the measured values,
calculate a delta value between the minimum value and the maximum value,
compare the delta value to a maximum delta value, and
on a first condition that the delta value exceeds the maximum delta value, transmit a first disable signal to disable an associated transmitter associated with the maximum temperature value.

23. The radar system of embodiment 22, wherein: in response to disabling the associated transmitter, the controller is configured transmit a first enable signal to re-enable the associated transmitter in response to detecting a subsequent measured value of the associated transmitter within a tolerance range of subsequent measured values of remaining transmitters.

24. The radar system of embodiment 22, wherein: on the first condition that the delta value exceeds the maximum delta value, the controller is configured to transmit disable signals to the plurality of radar MMICs to disable the plurality of transmitters in a round-robin manner.

25. The radar system of embodiment 19, wherein: the plurality of radar MMICs comprise a plurality of receivers, and each MMIC of the plurality of radar MMICs which comprises a receiver of the plurality of receivers comprises a portion of the plurality radar signal channels, wherein the receiver is enabled independently of the plurality of transmitters.

26. The radar system of embodiment 18, wherein the controller is configured to synchronously sample the sensor data of the plurality of sensors at predetermined sampling times.

27. The radar system of embodiment 18, wherein: each of the plurality of radar MMICs comprises:
a subset of radar signal channels of the plurality of radar signal channels; and
at least one sensor of the plurality of sensors, each of the at least one sensor is configured to measure the physical parameter related to the temperature of a corresponding radar signal channel of the subset of radar signal channels and generate the sensor data corresponding to the measured values of the physical parameter.

28. The radar system of embodiment 27, wherein: the controller is configured to compare the measured values of the plurality of radar signal channels to a maximum threshold, and on a first condition that a measured value of an associated radar signal channel exceeds the maximum threshold, the controller is configured to transmit a first disable signal to disable the associated radar signal channel.

29. The radar system of embodiment 28, wherein:

in response to disabling the associated radar signal channel, the controller is configured to receive a subsequent measured value of the associated radar signal and compare the measured value of the associated radar signal channel to a re-enable threshold, wherein the re-enable threshold is less than the maximum threshold, and on a second condition that the subsequent measured value of the associated radar signal channel is equal to or less than the re-enable threshold, the controller is configured to transmit a first enable signal to re-enable the associated radar signal channel.

30. The radar system of embodiment 27, wherein:

the controller is configured to compare the measured values of the plurality of radar signal channels to a maximum threshold, and on a first condition that a measured value of at least one radar signal channel exceeds the maximum threshold, the controller is configured to transmit disable signals to the plurality of radar MMICs to disable the plurality of radar signal channels in a round-robin manner.

31. The radar system of embodiment 27, wherein: the controller is configured to compare the measured temperature values of the plurality of radar signal channels of the plurality of radar MMICs to each other, including:

determine a minimum value of the measured values, determine a maximum value of the measured values, calculate a delta value between the minimum value and the maximum value, compare the delta value to a maximum delta value, and on a first condition that the delta value exceeds the maximum delta value, transmit a first disable signal to disable an associated radar signal channel associated with the maximum value.

32. The radar system of embodiment 31, wherein: in response to disabling the associated radar signal channel, the controller is configured transmit a first enable signal to re-enable the associated radar signal channel in response to detecting a subsequent measured value of the associated radar signal channel within a tolerance range of subsequent measured values of remaining radar signal channels of the plurality of radar MMICs.

33. The radar system of embodiment 18, wherein: each of the plurality of radar MMICs comprises a processing circuit configured to process radar signals, wherein each processing circuit is reconfigured in response to an enable-disable status of each radar signal channel of its radar MMIC.

34. A method of monitoring a plurality of radar monolithic microwave integrated circuits (MMICs) comprising a plurality of radar signal channels, the method comprising:

measuring a physical parameter related to a temperature of a corresponding radar MMIC for each of the plurality of MMICs;

generating sensor data corresponding to measured values of the physical parameter for each of the plurality of MMICs; and determining a channel operation of the plurality of radar signal channels, including selectively disabling at least a first radar signal channel of the plurality of radar signal channels and selectively enabling at least a second radar signal channel of the plurality of radar signal channels based on the measured values.

The described embodiments relies on a central entity gathering and interpreting the information from the temperature sensors and triggering a corresponding reaction in terms of MMIC deactivations. This function can be implemented either in a central microcontroller 60 or in one of the MMICs elected to a master role (e.g., the master MMIC 1). The described embodiments can be applied within one MMIC or across multiple MMICs by monitoring and selectively deactivating individual channels within one MMIC or across multiple MMICs. This may rely on having dedicated temperature sensors inside each channel on the chip. The intra-MMIC and inter-MMIC scenarios can also be combined together, to have maximum flexibility and minimal performance degradation while deactivating channels.

While various embodiments have been disclosed, it will be apparent to those skilled in the art that various changes and modifications can be made which will achieve some of the advantages of the concepts disclosed herein without departing from the spirit and scope of the invention. For example, while embodiments have been described with respect to FMCW radar, other radar operation may include for example phase modulation continuous wave (PMCW) radar, OFDM radar etc. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent on the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof, including any combination of a computing system, an integrated circuit, and a computer program on a non-transitory computer-readable recording medium. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments, a single act may include or may be broken into multiple sub acts. Such sub acts may be included and part of the disclosure of this single act unless explicitly excluded.

What is claimed is:

1. A radar system, comprising:
a radar monolithic microwave integrated circuit (MMIC) comprising:
a plurality of radar signal channels; and
at least one sensor configured to measure a physical parameter related to a temperature of the radar MMIC, and to generate sensor data corresponding to measured values of the physical parameter; and
a controller configured to receive the sensor data from the at least one sensor, and to determine a channel operation of the plurality of radar signal channels, including selectively disabling at least a first radar signal channel of the plurality of radar signal channels and selectively enabling at least a second radar signal channel of the plurality of radar signal channels based on the measured values,
wherein the at least one sensor includes a plurality of sensors each associated with a different one of the plurality of radar signal channels for measuring the physical parameter corresponding thereto,
wherein the controller is configured to compare the measured values to a maximum threshold,
wherein on a first condition that a measured value of an associated radar signal channel exceeds the maximum threshold, the controller is configured to transmit a first disable signal to disable the associated radar signal channel,
wherein in response to disabling the associated radar signal channel, the controller is configured to receive a subsequent measured value of the associated radar signal and compare the subsequent measured value to a re-enable threshold, wherein the re-enable threshold is less than the maximum threshold, and
wherein on a second condition that the subsequent measured value of the associated radar signal channel is equal to or less than the re-enable threshold, the controller is configured to transmit a first enable signal to re-enable the associated radar signal channel.

2. The radar system of claim 1, wherein:
the controller is configured to selectively enable and disable the plurality of radar signal channels in a round-robin manner such that selectively disabled and selectively enabled radar signal channels change in the round-robin manner.

3. The radar system of claim 1, wherein the controller is configured to synchronously sample the sensor data of the plurality of sensors at predetermined sampling times.

4. The radar system of claim 1, wherein:
on a third condition that the measured values of the plurality of radar signal channels each exceed the maximum threshold, the controller is configured to transmit a second disable signal to disable the plurality of radar signal channels.

5. The radar system of claim 1, wherein:
the controller is configured to compare the measured values of the plurality of radar signal channels to each other, including:

determine a minimum value of the measured values,
determine a maximum value of the measured values,
calculate a delta value between the minimum value and the maximum value,
compare the delta value to a maximum delta value, and
on a third condition that the delta value exceeds the maximum delta value, transmit a second disable signal to disable a radar signal channel associated with the maximum value.

6. The radar system of claim 5, wherein:
in response to disabling the associated radar signal channel, the controller is configured transmit a second enable signal to re-enable the associated radar signal channel in response to detecting the subsequent measured value of the associated radar signal channel within a tolerance range of subsequent measured values of remaining transmit channels.

7. The radar system of claim 5, wherein:
on the first condition that the delta value exceeds the maximum delta value, the controller is configured to transmit the second disable signal to disable the plurality of transmit channels in a round-robin manner.

8. The radar system of claim 1, wherein:
the controller is configured to compare the measured values of the plurality of radar signal channels to each other, including:
determine an average value of the measured values,
calculate at least one delta value for each of the measured values that exceeds the average value, each of the at least one delta value corresponding to a difference between a different one of the measured values and the average value,
compare each of the at least one delta value to a maximum delta value, and
on a third condition that a delta value of the at least one delta value exceeds the maximum delta value, transmit a second disable signal to disable a radar signal channel associated with the delta value that exceeds the maximum delta value.

9. The radar system of claim 1, wherein:
the radar MMIC comprises a digital processing circuit configured to process baseband data of radar signals to determine a direction of arrival, and
the radar MMIC is configured to reconfigure a processing of the baseband data to take into account at least the first radar signal channel of the plurality of radar signal channels that is selectively disabled.

10. A method of monitoring a radar monolithic microwave integrated circuit (MMIC) comprising a plurality of radar signal channels, the method comprising:
measuring a physical parameter related to temperature of the radar MMIC;
generating sensor data corresponding to measured values of the physical parameter; and
determining a channel operation of the plurality of radar signal channels based on the measured values, including selectively disabling at least a first transmitter radar signal channel of the plurality of radar signal channels and selectively enabling at least a second transmitter radar signal channel of the plurality of radar signal channels, wherein receiver signal channels of the radar MMIC remain enabled and operable.

11. A radar system, comprising:
a plurality of a radar monolithic microwave integrated circuits (MMICs) comprising a plurality of radar signal channels and a plurality of sensors configured to measure a physical parameter related to a temperature of a corresponding radar MMIC and generate sensor data corresponding to measured values of the physical parameter; and a controller configured to receive the sensor data from each sensor of the plurality of sensors, and determine a channel operation of the plurality of radar signal channels, including selectively disabling at least a first radar signal channel of the plurality of radar signal channels and selectively enabling at least a second radar signal channel of the plurality of radar signal channels based on the measured values.

12. The radar system of claim 11, wherein:
the plurality of radar MMICs comprise a plurality of transmitters,
each radar MMIC of the plurality of radar MMICs which comprises a transmitter comprises:
a portion of the plurality radar signal channels that are used by the transmitter; and
a sensor of the plurality of sensors,
the controller is configured to determine the channel operation of the plurality of radar signal channels by selectively disabling at least a first transmitter of the plurality of transmitters and selectively enabling at least a second transmitter of the plurality of transmitters based on the measured values.

13. The radar system of claim 12, wherein:
the controller is configured to compare the measured values of the plurality of transmitters to each other, including:
determine a minimum value of the measured values,
determine a maximum value of the measured values,
calculate a delta value between the minimum value and the maximum value,
compare the delta value to a maximum delta value, and
on a first condition that the delta value exceeds the maximum delta value, transmit a first disable signal to disable an associated transmitter associated with the maximum value.

14. The radar system of claim 13, wherein:
in response to disabling the associated transmitter, the controller is configured transmit a first enable signal to re-enable the associated transmitter in response to detecting a subsequent measured value of the associated transmitter within a tolerance range of subsequent measured values of remaining transmitters.

15. The radar system of claim 12, wherein:
the plurality of radar MMICs comprise a plurality of receivers,
each radar MMIC of the plurality of radar MMICs which comprises a receiver comprises:
a portion of the plurality radar signal channels that are used by the receiver, wherein the receiver is enabled independently of the plurality of transmitters.

16. The radar system of claim 11, wherein the controller is configured to synchronously sample the sensor data of the plurality of sensors at predetermined sampling times.

17. The radar system of claim 11, wherein:
each of the plurality of radar MMICs comprises:
a subset of radar signal channels of the plurality of radar signal channels; and
at least one sensor of the plurality of sensors, each of the at least one sensor is configured to measure the physical parameter related to the temperature of a corresponding radar signal channel of the subset of radar signal channels and generate the sensor data corresponding to the measured values of the physical parameter.

18. The radar system of claim 17, wherein:
the controller is configured to compare the measured values of the plurality of radar signal channels to a maximum threshold, and
on a first condition that a measured value of an associated radar signal channel exceeds the maximum threshold, the controller is configured to transmit a first disable signal to disable the associated radar signal channel.

19. The radar system of claim 17, wherein:
the controller is configured to compare the measured values of the plurality of radar signal channels of the plurality of radar MMICs to each other, including:
determine a minimum value of the measured values,
determine a maximum value of the measured values,
calculate a delta value between the minimum value and the maximum value,
compare the delta value to a maximum delta value, and
on a first condition that the delta value exceeds the maximum delta value, transmit a first disable signal to disable an associated radar signal channel associated with the maximum value.

20. The radar system of claim 19, wherein:
in response to disabling the associated radar signal channel, the controller is configured transmit a first enable signal to re-enable the associated radar signal channel in response to detecting a subsequent measured value of the associated radar signal channel within a tolerance range of subsequent measured values of remaining radar signal channels of the plurality of radar MMICs.

21. The radar system of claim 17, wherein:
the controller is configured to compare the measured values of the plurality of radar signal channels to a maximum threshold, and
on a first condition that a measured value of at least one radar signal channel exceeds the maximum threshold, the controller is configured to perform a round-robin protocol which includes transmitting disable signals to the plurality of radar MMICs to disable the plurality of radar signal channels in a round-robin manner.

22. The radar system of claim 21, wherein performing the round-robin protocol includes sequentially disabling and reenabling the plurality of radar signal channels in a round-robin manner until all of the plurality of radar signal channels are operating at a temperature below a re-enable temperature threshold.

23. The radar system of claim 11, wherein: each of the plurality of radar MMICs comprises a processing circuit configured to process radar signals, wherein each processing circuit is reconfigured in response to an enable-disable status of each radar signal channel of its radar MMIC.

24. A method of monitoring a plurality of radar monolithic microwave integrated circuits (MMICs) comprising a plurality of radar signal channels, the method comprising:
measuring a physical parameter related to a temperature of a corresponding radar MMIC for each radar MMIC of the plurality of MMICs;
generating sensor data corresponding to measured values of the physical parameter for each radar MMIC of the plurality of radar MMICs; and
determining a channel operation of the plurality of radar signal channels, including selectively disabling at least a first radar signal channel of the plurality of radar signal channels and selectively enabling at least a second radar signal channel of the plurality of radar signal channels based on the measured values.

* * * * *